A. J. T. Reuter,
Lemon Squeezer,
No 63,304. Patented Mar. 26, 1867.
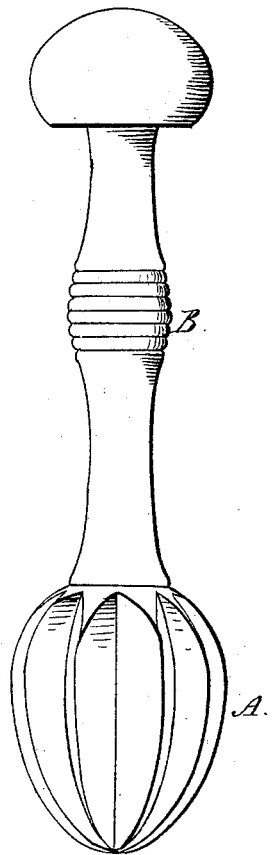
Witnesses;
J. Litch
H. P. Cutter.
Inventor;
August J. T. Reuter.

United States Patent Office.

AUGUST J. T. REUTER, OF BOSTON, MASSACHUSETTS.

Letters Patent No. 63,304, dated March 26, 1867; antedated March 18, 1867.

IMPROVED LEMON SQUEEZER.

*The Schedule referred to in these Letters Patent and making part of the same.*

TO ALL WHOM IT MAY CONCERN:

Be it known that I, AUGUST J. T. REUTER, of Boston, in the county of Suffolk, in the State of Massachusetts, have invented a new and useful Instrument for Expressing and Removing the Juice and Pulp from Lemons and Oranges; and I do hereby declare that the following is a full and exact description thereof, reference being had to the accompanying drawings and to the letters of reference marked thereon.

The nature of my invention consists in a grooved bulb or knob, so formed as to adjust itself to the inside of a half lemon or orange, which knob is attached to a lever or handle of sufficient size and length to enable the operator to conveniently hold it while applying it to the fruit.

To enable others skilled in the art to make and use my invention, I will proceed to describe its construction and operation.

I construct a knob or bulb, A, so as to make the bulb a presser, and the grooves a scraper, to the inside of a lemon or orange, thus constituting it both a pulper and presser. This bulb is either made in connection with a lever or handle, B, or securely attached to it if made separately.

I take a lemon or orange and cut it in two, and take one-half in the palm of my left hand and apply the grooved bulb of the presser with my right hand to the inside of the fruit, and pressing it, with a few twists back and forth of the presser, liberate both juice and pulp; thus avoiding the bruising of the seeds or rind so as not to extract the bitter principle, leaving the juice pure, the rind unmutilated for preserving purposes, and entirely cleaned both of pulp and juice; the instrument being easily worked, durable, and cheap.

What I claim as my invention, and desire to secure by Letters Patent, is—

A grooved bulb or knob, constructed substantially as above set forth for the purposes herein specified.

AUGUST J. T. REUTER.

Witnesses:
   J. LITCH,
   H. P. CUTTER.